United States Patent [19]

Munaoka

[11] Patent Number: 4,984,075
[45] Date of Patent: Jan. 8, 1991

[54] CONTOUR DETECTING APPARATUS
[75] Inventor: Yutaka Munaoka, Kariya, Japan
[73] Assignee: Nippondenso Co., Ltd., Kariya, Japan
[21] Appl. No.: 381,188
[22] Filed: Jul. 18, 1989
[30] Foreign Application Priority Data Jul. 18, 1988 [JP] Japan ................................ 63-178791

[51] Int. Cl.[5] .......................... H04N 7/18; H04N 7/00
[52] U.S. Cl. ...................................... 358/107; 358/93;
358/96; 901/7; 382/8; 340/724
[58] Field of Search ................ 358/138, 488, 93, 107,
358/96; 356/375; 901/7; 382/8; 340/724

[56] References Cited
U.S. PATENT DOCUMENTS

| | | | |
|---|---|---|---|
| 4,627,096 | 12/1986 | Grattoni et al. | 328/107 |
| 4,847,911 | 7/1989 | Morimoto | 382/8 |
| 4,853,771 | 8/1989 | Witriol et al. | 358/107 |
| 4,859,999 | 8/1989 | Koso | 382/8 |
| 4,860,371 | 8/1989 | Matsuyama et al. | 382/8 |

FOREIGN PATENT DOCUMENTS 59-90176  5/1984  Japan .
60-215284 10/1985  Japan .

Primary Examiner—John K. Peng
Attorney, Agent, or Firm—Cushman, Darby & Cushman

[57] ABSTRACT

A countour detecting apparatus which comprises: a picture-data input device for the input of data on a picture including an object to be detected; a video-signal generator for scanning the data on the picture and generating video signals each corresponding to luminance of each pixel of the picture; a picture-data memory for sampling the video signals corresponding to each of two-dimensional coordinates of the pixels and storing the sampled video-signals; and a contour detector for moving a pair of a first picture section and a second picture section, which is arranged to be apart by a predetermined distance from the placed in parallel with the first picture section, in the picture stored in the picture-data memory, the countour detector also detecting the position of the first and second picture section in case where the absolute value of the difference between a first sum of the video signals stored in the picture-data memory corresponding to the pixels in the first picture section and a second sum of the video signals stored in the picture-data memory corresponding to the pixels in the second picture section is maximum. Thereby, even when a picture including an object is not clear, the contour of the object can be surely detected. Further, the period of time required for processing of detection of the contour of an object can be substantially decreased.

6 Claims, 6 Drawing Sheets

CONTOUR DETECTING APPARATUS

BACKGROUND OF THE INVENTION

1. Field of the Invention

This invention generally relates to an object recognizing apparatus and more particularly to a contour detecting apparatus for detecting the position of a specific object for use in automobile equipment and in a factory automated by using a robot and so on.

2. Description of the Related Art

A typical apparatus and a method for detecting a position or contour of an object as disclosed in the Japanese Patent Application Provisional Publication No. 60-215284. The typical method comprises steps of first calculating run-length of each sequence of pixels or picture elements having same intensity on a path of the object such as a semicircle and then determining the position of the object by detecting the position of a pixel at which the intensity thereof changes from that of the adjacent pixel. This conventional technique is applied to, for example, inspection of a speedometer of an automobile as follows. First, run-length of each sequence of pixels having same intensity on a periphery of an inscribed square of a major arc $\overline{CDAB}$ which is a path of an end portion of an indicator of a speedometer (see FIGS. 10(a) and 10(b)). Then, the current position of the indicator on the square is detected on the basis of change in the intensity of pixels. Further, the corresponding position $\alpha$ of the end portion of the indicator on the arc is calculated from the calculated run-lengths.

Such a typical apparatus, however, has drawbacks that the position of an object to be recognized cannot be detected if the image or picture of the object is blurred by a stain and lustre on the surface of the object further, when the position detection of an object having an concavity in the contour thereof is attempted, the position detection of such an object cannot be performed due to the difference between the position data of the point of the inflection and the predetermined correct position of the point of the inflection, which difference is caused by a concavity of the object.

The present invention is accomplished to eliminate such drawbacks of the typical apparatus above described.

SUMMARY OF THE INVENTION

It is accordingly an object of the present invention to provide a contour detecting device which can surely determine the position of an object regardless of the condition and contour of the surface of the object.

To achieve the foregoing object and in accordance with a first aspect of the present invention, a contour detecting apparatus is disclosed which comprises: a picture-data input device for the input of data on a picture including an object to be detected, a video-signal generating means for scanning the data on the picture and generating video signals each corresponding to luminance of each pixel of the picture; a picture-data memory means for sampling the video signals corresponding to each of two-dimensional coordinates of the pixels and storing the sampled video-signals; and a contour detecting means for moving a pair of a first picture section and a second picture section, which is arranged to be apart by a predetermined distance from and placed in parallel with the first picture section, in the picture stored in the picture-data memory means and for detecting the position of the first and second picture section in case where the absolute value of the difference between a first sum of the video signals stored in the picture-data memory means corresponding to the pixels in the first picture section and a second sum of the video signals stored in the picture-data memory means corresponding to the pixels in the second picture section is maximum.

Thus, in the contour detecting apparatus constructed in the above described manner, when the absolute value of the difference between the first sum of the video signals corresponding to the pixels in the first picture section and the second sum of the video signals corresponding to the pixels in the first picture section is maximum, an area existing between the first and second picture sections corresponds to the periphery of the object.

Thereby, the present invention has an excellent advantage in that even when a picture including an object is not clear, the object can be surely detected.

Furthermore, by the apparatus of the present invention, only the subtraction between the first and second sums is required to detect the position of the object. Thus, the period of time required for processing of detection of the position of an object can be substantially decreased.

In accordance with a second aspect of the present invention, there is provided a contour detecting apparatus which comprises: a picture-data input device for the input of data on a picture including an object to be detected; a video-signal generating means for scanning the data on the picture and for generating video signals each corresponding to luminance of each pixel of the picture; a picture-data memory means for sampling the video signals corresponding to each of two-dimensional coordinates of the pixels and storing the sampled video-signals, a sum calculating means for moving a pair of first picture section and a second picture section, which is arranged to be apart by a predetermined distance from and placed in parallel with the first picture section, in the picture stored in the picture-data memory means, the sum calculating means calculating a first sum of the video signals stored in the picture-data memory means corresponding to the pixels in the first picture section and a second sum of the video signals stored in the picture-data memory corresponding to the pixels in the second picture section; and a contour detecting means for detecting the position of the first and second picture section in case where the absolute value of the difference between the first sum of the video signals stored in the picture-data memory means corresponding to the pixels in the first picture section and the second sum of the video signals stored in the picture-data memory means corresponding to the pixels in the second picture section is greater than a predetermined value.

Thereby, the period of time required for processing of detection of the position of an object can be further decreased.

In accordance with a third aspect of the present invention, a contour detecting apparatus is disclosed which comprises: a picture-data input device for the input of data on a picture including an object to be detected; a video-signal generating means for scanning the data on the picture and generating video signals each corresponding to luminance of each pixel of the picture; a picture-data memory means for sampling the video signals corresponding to each of two-dimensional coordinates of the pixels and storing the sampled video-signals; a moving means for moving a pair of a first picture section and a second picture section, the first picture section having a form of which form is the same with the form of a part of the periphery of the object, the second picture section being arranged to be apart by a predetermined distance from and placed in parallel with the first picture section, in the picture stored in the picture-data memory means; a first sum calculating means for calculating a first sum of the video signals stored in the picture-data memory means corresponding to the pixels in the first picture section; a second calculating means for a second sum of the video signals stored in the picture-data memory corresponding to the pixels in the second picture section; a difference calculating means for calculating the difference between the first sum of the video signals stored in the picture-data memory means corresponding to the pixels in the first picture section and the second sum of the video signals stored in the picture-data memory corresponding to the pixels in the second picture section; and a contour detecting means for detecting the position of the first and second picture section as the position of the object in case where the absolute value of the difference between the first sum and the second sum is maximum.

Thereby, the object can be surely detected and the period of time required for processing of detection of the contour of an object can be substantially decreased.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which.

DETAILED DESCRIPTION OF PREFERRED EMBODIMENTS

Hereinafter, a preferred embodiment of the present invention will be described with reference to the accompanying drawings.

Figure 1:
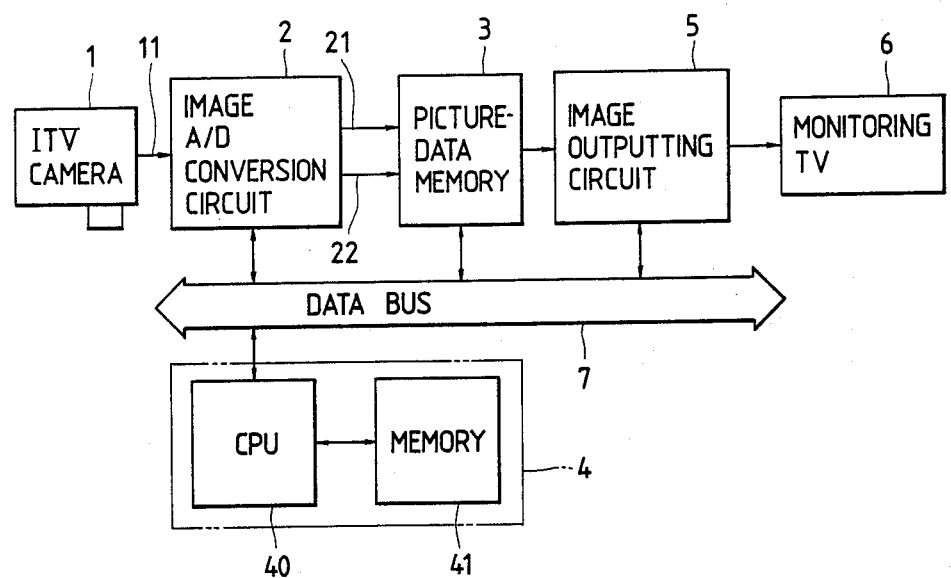
FIG. 1 is a schematic block diagram for showing the construction of a contour detecting apparatus embodying the present invention.

Referring to FIG. 1 which shows the construction of an embodiment of the present invention, a telecamera or television camera 1 is comprised of an image pickup portion and a controller for controlling the image pickup portion. The controller effects horizontal scanning and vertical scanning of the image pickup portion and thereafter outputs video signals to an image analog-to-digital (A/D) conversion circuit 2.

Further, the A/D conversion circuit 2 is an electronic circuit which performs sampling of the video signals such that each of the sampled video signal corresponds to two-dimensional coordinates of each pixel of an input picture, that is, performs sampling of the pixels of the input picture. Furthermore, the A/D conversion circuit 2 converts the resulting video signals, that is, the sampled video signals into digital signals and then outputs address signals 21 and luminance data signals 22. Pulse signals, which are started by a vertical synchronizing signal and have a period of time equivalent to 1/256 of a horizontal line time (that is, a period of time required for each horizontal scanning line), are outputted as the address signals 21. Further, the address signals 21 are in synchronization with a horizontal synchronizing signal every time 256 pulses are outputted. Moreover, the luminance data signals 22 indicate digital levels of the luminance of the video signal, each of which is represented by a number ranged from 0 to 15.

A picture-data memory (hereunder sometimes referred to as an image memory) 3 is a storage device for storing the digital signals inputted from the image A/D conversion circuit 2.

A computer 4 is comprised of a central processing unit (CPU) 40 and another memory 41 for storing programs and so forth.

An image outputting circuit 5 is provided to display the position of an object 8, which is computed by the computer 4, on a screen of a monitoring television 6 through which users verify whether or not the position of the object 8 is accurately detected.

Further, a data bus 7 (hereunder referred to as a CPU bus) is provided for transferring signals between the CPU 40 of the computer 4 and each of the image A/D conversion circuit 2, the image memory 3 and the image outputting circuit 5.

Hereunder, an operation of this embodiment ill be described in detail.

Figure 2:
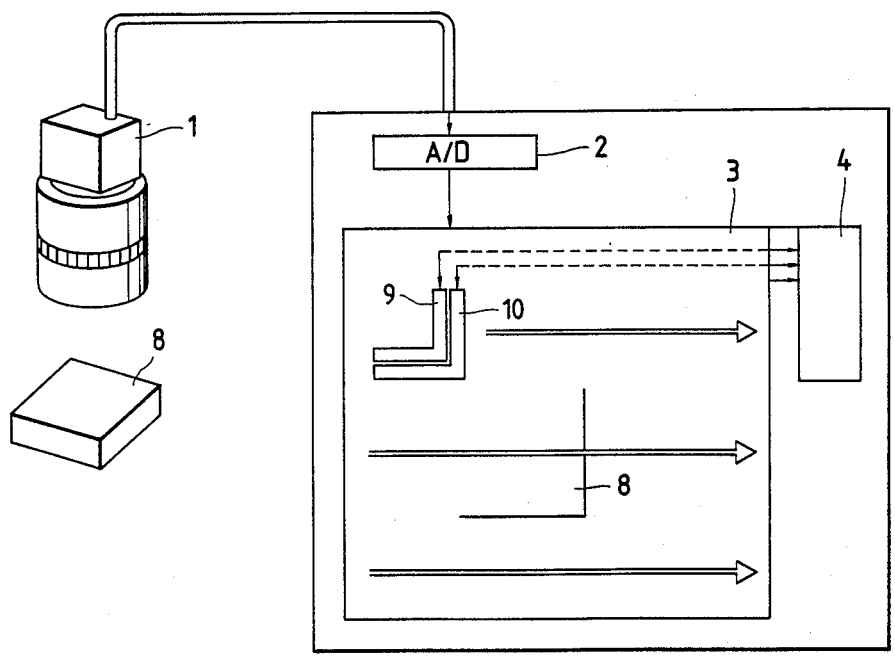
FIG. 2 is a diagram for illustrating an operation of the embodiment of FIG. 1.
Figure 4:
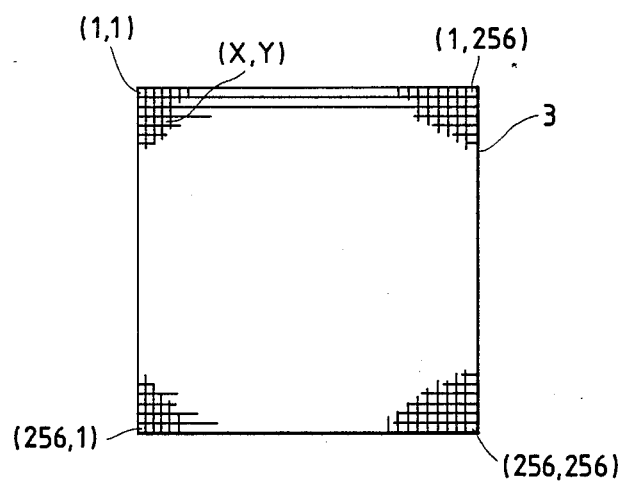
FIG. 4 is a diagram for showing the arrangement of pixels of a picture.

To begin with, an operation of detecting the position of an object 8 by detecting its edge contour in case where the object is, for example, a rectangle will be described hereinbelow. First, the rectangular object 8 is transferred by a conveyer (not shown) and is placed under the television camera 1 as shown in FIG. 2. Then, a picture of the object 8 is taken by the television camera 1 which outputs video signals 11 representing the picture to the image A/D conversion circuit 2. At that time, each picture frame is composed of 256 horizontal scanning lines. Thereafter, as shown in FIG. 4, the video signals 11 are sampled by the A/D conversion circuit 2 in such a manner to correspond to two-dimensional coordinates of each of 256×256 pixels sampled from the picture. Further, the A/D conversion circuit 2 outputs the luminance data signal 22 obtained by converting the luminance levels of the pixels into digital levels as well as the address signals 21 each indicating a specific unit area in the picture to the image memory 3, as shown in FIG. 1. The image memory 3 stores data of addresses (X, Y) of the sampled pixels indicated by the address signals 21 and data of the digital luminance levels $W_i$ of the sampled pixels indicated by the luminance data signals 22 as a two-dimensional luminance distribution function $F(W_1, X, Y)$.

Figure 3:
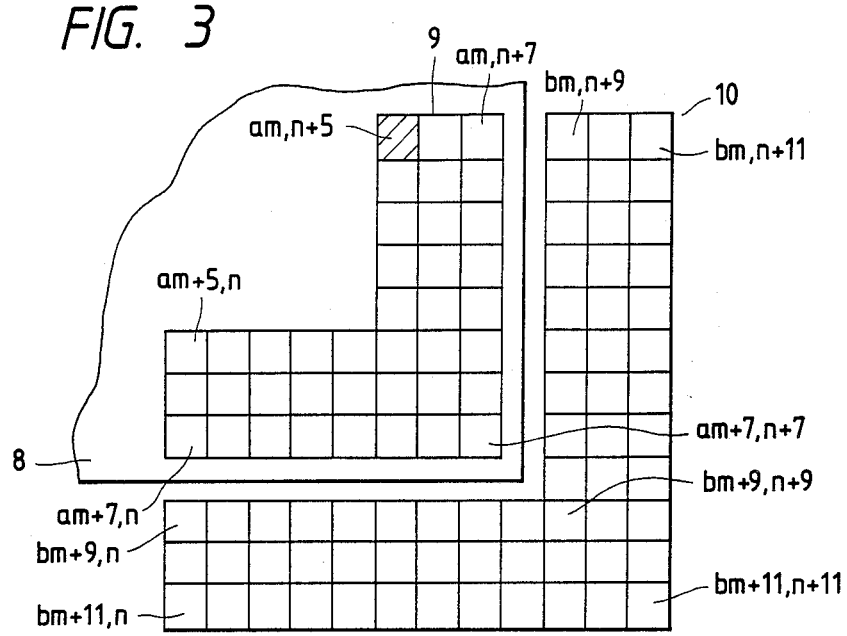
FIG. 3 is an enlarged fragmentary plan view of a first and second windows of FIG. 2.

Furthermore, in the computer 4, a first window or picture section 9 and a second window 10 as shown in FIG. 3 are set from an application program. Here, it should be noted that for the purpose of knowing the positions of whole parts of the rectangular object 8, it is not necessary to detect the positions of all of four corners of the object 8 (e.g., the contours) but enough to detect the contour of only one corner of the object 8 because the various size of the rectangular object 8 is already known prior to the picture-taking thereof by the television camera 1 and the direction of a side of the object 8 is determined when set under the television camera 1.

Thus, these L-shaped windows 9 and 10 are set in such a manner that the second window 10 is shifted by one pixel from the first window 9 with each side of the former window being parallel to the corresponding side of the latter. In FIG. 3, each of the smallest squares represents a pixel of the picture. Further, in this figure, each of reference characters a and b denotes a pixel of the input picture and additionally a pair of subscripts thereof indicates two-dimensional coordinates of the pixel of the input picture stored in the image memory 3 shown in FIG. 4. Namely, a right and left subscripts of the reference character a or b represent the column number and the row number of the denoted pixel in the array of the picture data stored in the image memory 3, respectively. Herein, such a pair of the column number and the row number is sometimes referred to as coordinates. For example, $a_{m, n+6}$ indicates a pixel of which coordinates are $(m, n+6)$. Furthermore, as is seen from this figure, the limits (that is, the coordinates of corners) of the windows 9 and 10 are specified in coordinates.

Figure 5:
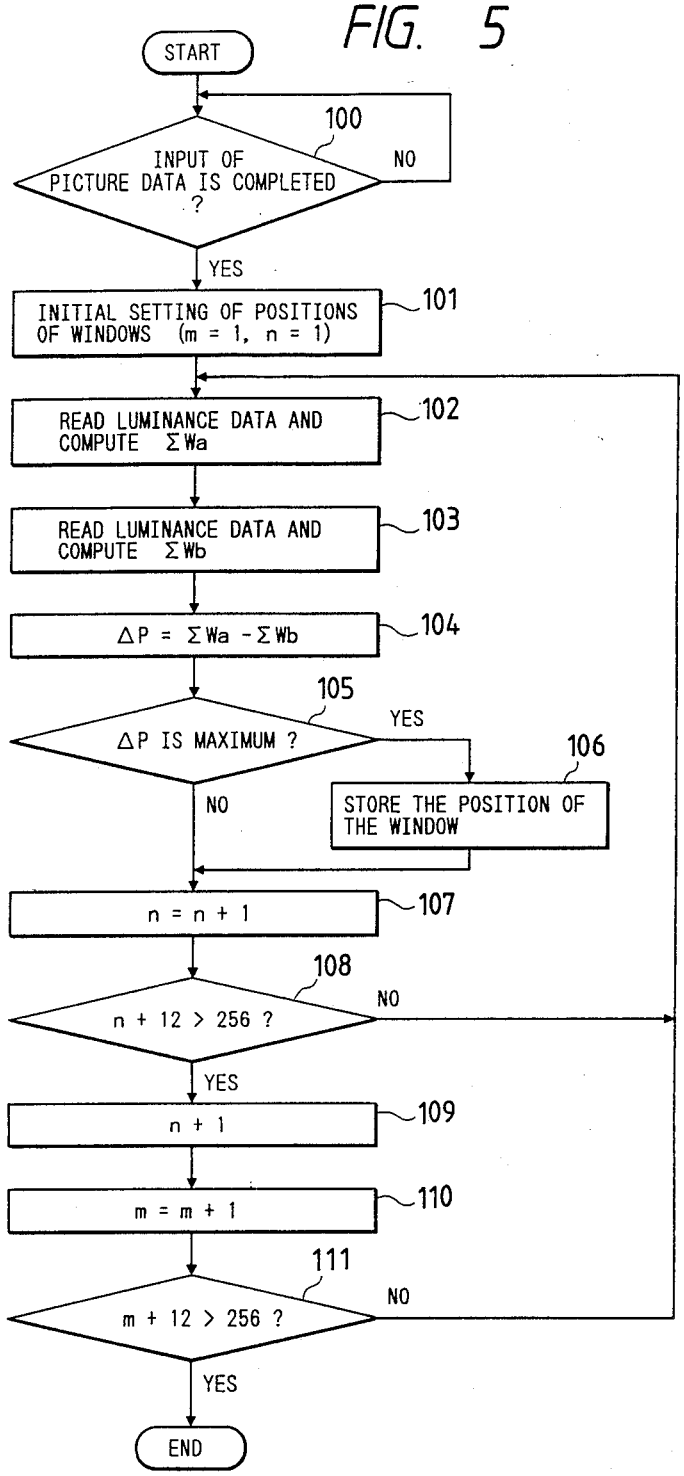
FIG. 5 is a flowchart of a program for a control operation executed by a computer used in the embodiment of FIG. 1.

Next, a control operation of the microcomputer 4 will be described with reference to FIG. 5 which shows the flowchart of the program executed by the microcomputer 4. The program is initiated at step 100 which determines whether or not the input of the picture data into the image memory 3 is completed.

If completed, the program advances to step 101 whereupon the first window 9 and the second window 10 are set at their initial positions corresponding to case where $m=1$ and $n=1$ in FIG. 3, respectively. Namely, the first and second windows 9 and 10 are initially placed at upward and leftward positions in the array of the picture data stored in the image memory 3 shown in FIG. 4.

The program next enters a loop including steps 102 thru 111. In step 102, the total sum of the luminance levels of the pixels in the first window 9 is calculated as follows.

First, the data representing the luminance level (hereunder sometimes referred to simply as luminance data) of the video signal corresponding to the pixel $a_{1, 6}$ is read out of the image memory 3. Subsequently, the reading of the luminance data is performed with respect to the pixels positioned on the same row or line of the first window to the rightward direction, as viewed in FIG. 3. Upon completion of reading the luminance data with respect to the pixels on the top line of the first window, the reading operation is continued with respect to the pixels of the next line placed just below the top line. In this way, the luminance data of the pixels $a_{1, 7}, a_{1, 8}, a_{2, 6} \ldots a_{6, 1} \ldots a_{8, 1} \ldots a_{8, 8}$ are further read from the image memory 3 in this order. Simultaneously with this, the total sum $\Sigma Wa$ of the luminance data of these pixels in the first window is calculated.

The program next executes step 103 whereupon the total sum of the luminance levels of the pixels in the second window 10 is calculated similarly as in case of the step 102. That is, the luminance data of the pixels $b_{1, 10}, b_{1, 11}, b_{1, 12}, b_{2, 10} \ldots b_{10, 1} \ldots b_{12, 1} \ldots b_{12, 12}$ are read out of the image memory 3 in this order and further the total sum $\Sigma Wb$ of these pixels in the second window is calculated.

Next, the program enters step 104 whereupon the difference $\Delta P$ between the sum $\Sigma Wa$ obtained in the step 102 and the sum $\Sigma Wb$ obtained in the step 103 is calculated.

Thereafter, the program advances to step 105 which judges whether or not the difference $\Delta P$ is maximum. In case where $m=1$ and $n=1$, the current value of the difference $\Delta P$ is maximum and stored in the computer 4. Thus, the program advances to step 106 whereupon the position or coordinates $(m, n+5)$ of the pixel $a_{m, n+5}$ (corresponding to the picture data located at the m-th row and the $(n+5)$-th column of the input picture stored in the image memory 3) of indicated by hatching in FIG. 3 is stored in the computer 4 as data representing the positions of the first and second windows 9 and 10. Here, it should be noted that any other one of the positions of the pixels included in the first and second windows may be employed as the data representing the positions of the first and second windows.

Thereafter, the program advances to step 107 whereupon the first and second windows 9 and 10 are shifted in the picture displayed on the screen of the monitor television 6 with remaining the above described relation between the positions of the first and second windows. For instance, if n is incremented by one (that is, $n=n+1$), the first and second windows 9 and 10 are simultaneously moved by a pixel to the right, as viewed in FIG. 3, in parallel with each other.

The program then enters branching step 108 which judges whether or not the quantity of an expression $(n+12)$ is greater than 256, that is, whether or not the right side of the second window reaches that of the input picture, as viewed in FIG. 3. If not greater than 256, the program returns to the step 102 whereupon the new total sum $\Sigma Wa$ of the luminance data of the pixels $a_{1, 7} \ldots a_{8, 9}$ of the first window is calculated similarly as in the previous occasion. Thereafter, the program executes the step 103 whereupon the new total sum $\Sigma Wb$ of the luminance data of the pixels $b_{1, 11} \ldots b_{12, 13}$ of the second window is calculated similarly as in the previous occasion. Further, the program enter the step 105 via the step 104 which calculates the new difference $\Delta P$ between the new total sums $\Sigma Wa$ and $\Sigma Wb$. In the step 105, it is checked whether or not the new value of the difference $\Delta P$ is greater than the stored value thereof. If greater than the stored value, the new value of the difference $\Delta P$ is stored in the computer 4 and the program exits the step 105 through the Y branch and advances to the step 106 whereupon data representing the positions of the first and second windows 9 and 10, that is, the new values of the coordinates $(m, n+5)$ of the pixel $a_{m, n+5}$ are also stored in the computer 4. Furthermore, the program advances to the step 105 through step 104. In the above described fashion, the steps 102 thru 108 are repeatedly executed every time the first and second windows are shifted by a distance corresponding to a pixel to the right as indicated by arrows in FIG. 2. When the right side of the second window 10 reaches that of the input picture stored in the image memory 3, the quantity of the expression (n+12) becomes greater than 256 in the step 108 and thus the program exits step 108 through the Y branch and advances to step 109 whereupon n is set as 1 again. Further, the program advances to step 110 whereupon m is incremented by 1 and is thus set as 2. Thereby, the first and second windows 9 and 10 are moved down by a distance corresponding to a pixel in the vertical direction, as viewed in FIG. 3. Then, the program enters branching step 111 which judges whether or not the quantity of an expression (m+12) is greater than 256, that is, whether or not the bottom side of the second window reaches that of the input picture stored in the image storage 3 of FIG. 2. If not greater than 256, the programs returns to the step 102 and again executes the loop including the steps 102 thru 111.

In this case, in the step 102, the total sum $\Sigma Wa$ of the luminous data of the pixels $a_{2, 5} \ldots a_{9, 8}$ in the first window 9 is newly calculated. Further, in the step 103, the total sum $\Sigma Wb$ of the luminous data of the pixels $b_{2, 10} \ldots b_{13, 12}$ in the second window 10 is newly calculated.

As above described, in the process for detecting the position of the object according to the present invention, the first and second windows are moved in the input picture as follows. That is, the first and second windows 9 and 10 are first shifted to the right by a distance corresponding to a pixel at a time until the right side of the second window 10 reaches that of the input picture as viewed in FIG. 2. When reaches the right side of the input picture, the first and second windows 9 and 10 are moved back to the left end of the input picture and are further shifted down by a distance corresponding to a pixel.

By iterating the above described operation of shifting the first and second windows, as indicated by the arrows in FIG. 2, the first and second windows can be moved all over the input picture stored in the image memory 3.

Incidentally, the number of the pixels sampled from the input picture is appropriately set by taking the required precision of detecting the contour of the object as well as the processing time required to detect the contour of the object into consideration. This is because of the facts that if the number of the sampled pixels is increased, the precision of the detected contour becomes higher but on the other hand the processing time required for detecting the position of the object is increased.

As above stated, the apparatus of the present invention detects or determines the contour of an object in an input picture by using the first window 9 and the second window 10 and determines the position of the first and second window at which the difference between the total sum of the luminance data of the pixels of the first window and that of the luminance data of the pixels of the second window is maximum. Thereby, the periphery of the object can be surely detected even if the input picture including the object is relatively unclear.

Further, in the above described embodiment, a coner of the object 8 is detected by using only the first and window 9 and the second window 10. Thus, the apparatus of the present invention has only to add the luminance data of the pictures in the windows. Consequently, the processing time required for detecting the position of an object can be substantially reduced.

Furthermore, in the above described embodiment, when the first window 9 and the second window 10 reaches the rightward and downward end of the input picture, the program exits step 111 through the Y branch and thus the process of detecting the position of an object is finished.

In the above described manner, in the step 106, the position of the first window 9 and the second window 10, at which the difference $\Delta P$ has the maximum value thereof, can be determined. Further, when the difference $\Delta P$ is maximum, it can be considered that the corner or edge of the object 8 is present between the first window 9 and the second window 10. Therefore, the position of the first window 9 and the second window 10, at which the difference $\Delta P$ has the maximum value thereof, can be determined as that of the corner or edge of the object 8.

Figure 6:
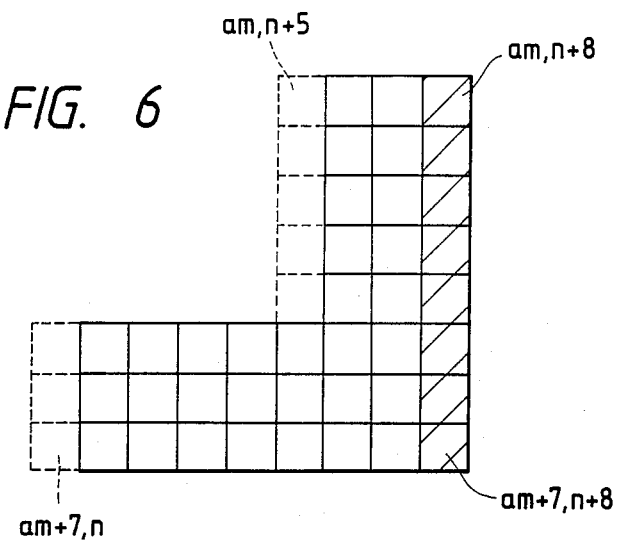
FIG. 6 is a diagram for illustrating how to calculate the sum of luminance levels of the pixels of a window in case where the window is shifted by one column in the horizontal direction of the picture.

Incidentally, when the windows 9 and 10 are shifted by a distance corresponding to a pixel in the horizontal direction, as viewed in FIG. 2, the same result of the detection of the position of the object can be obtained by subtracting the sum $(\Sigma a_{x, n+5} + \Sigma a_{x, n})$ of the luminance data of the pixels indicated by dashed lines in FIG. 6 from the sum $\Sigma Wa$ of the luminance data of all of the pixels in the first window 9 obtained at the latest time and then adding the result of the subtraction to the sum $(\Sigma a_{x, n+8})$ of the luminance data of the hatched pixels in FIG. 6 instead of reading all of the luminance data of the pixels in the first window 9 and the second window 10 and calculating the sum of the luminance data of all of the pixels in the first window 9 and that of the luminance data of all of the pixels in the second window 10 in the above described embodiment.

Figure 9:
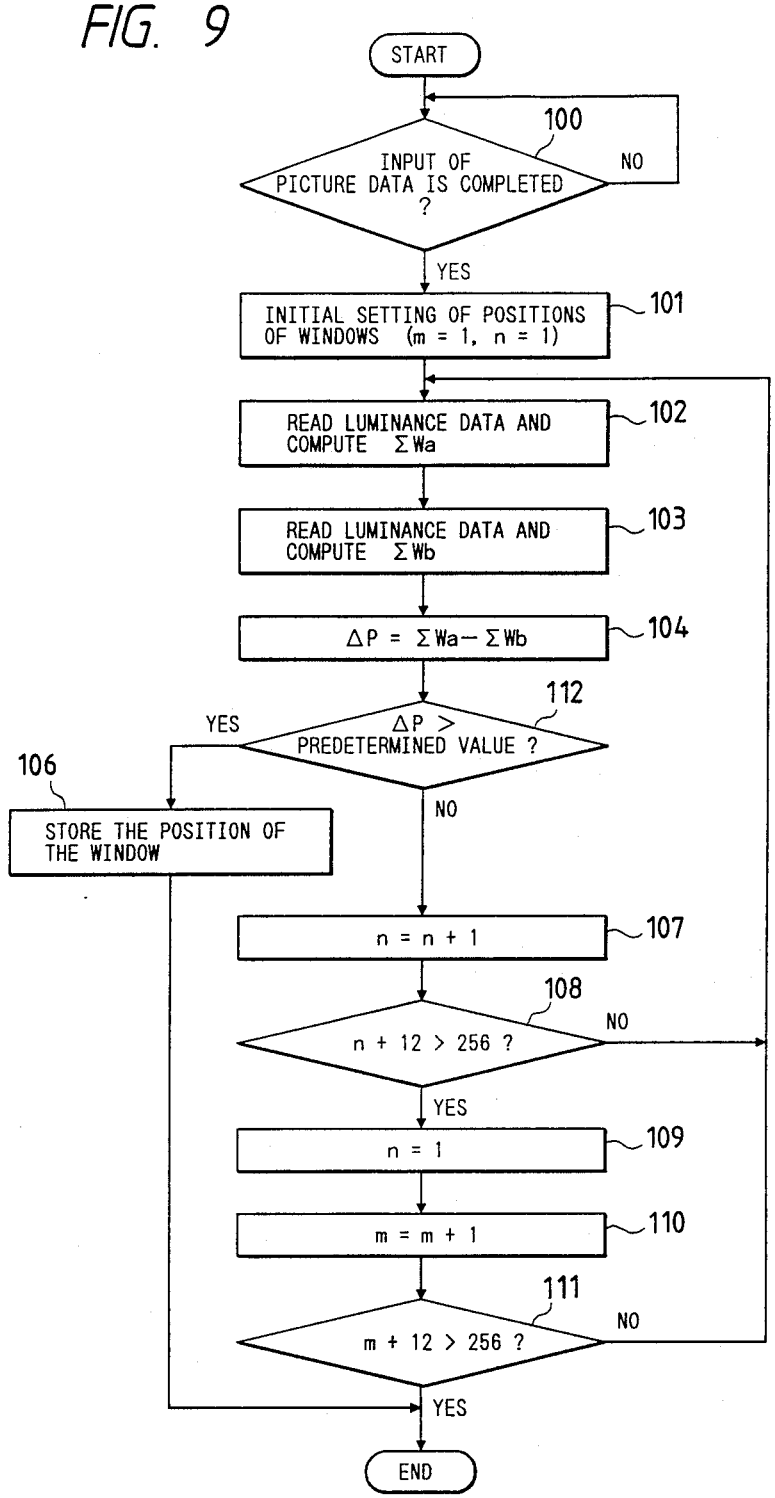
FIG. 9 is a flowchart of the processing executed by a computer used in another embodiment of the present invention.
Figure 10A:
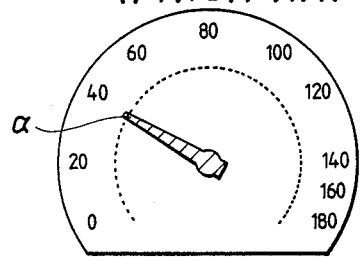
FIGS. 10(a) and 10(b) are diagrams for illustrating a conventional method for detecting the position of an object.
Figure 10B:
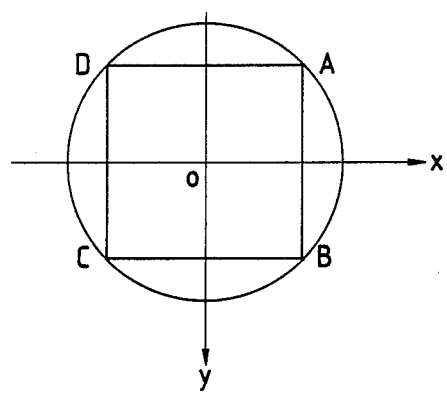

Next, another preferred embodiment (hereunder referred to as a second embodiment) of the present invention will be described hereunder by referring to FIG. 9. The construction of hardware of the second embodiment is the same as that of the previously described embodiment (hereunder referred to as the first embodiment) shown in FIG. 1. In FIG. 9, operations effected in steps indicated by like reference numerals are the same as effected in the corresponding steps in the process shown in FIG. 5. Further, as shown in FIG. 9, the difference $\Delta P$ between the the sum $\Sigma Wa$ and the sum $\Sigma Wb$ is calculated in the step 104 and further, in the step 112, it is judged whether or not the difference $\Delta P$ is greater than a predetermined value. If greater than the predetermined value, the program exits step 112 via the Y branch and advances to the step 106 whereupon data representing the positions of the first window 9 and the second window 10 are stored in the computer 4.

That is, in the second embodiment, the position of an object 8 is determined as that of the first or second window when the difference $\Delta P$ is greater than the predetermined value. In other words, in the second embodiment, a corner of the object 8 is considered to be present between the first window 9 and the second window 10 when the difference $\Delta P$ is greater than the predetermined value.

Thus, in case of the second embodiment, after the contour of the object 8 is once detected (that is, the difference $\Delta P$ is once determined to be greater than the predetermined value), there is no necessity of further shifting the first and second windows. Thereby, the period of time required to detect the position of the object can be substantially decreased in comparison with the first embodiment.

Figure 7:
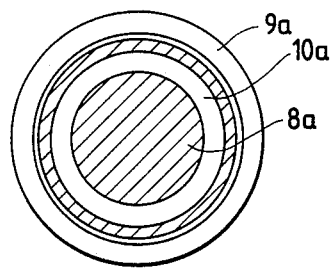
FIG. 7 is a diagram for showing other examples of first and second windows.

As above stated, in the first and second embodiments, the contour of the rectangular object 8, of which the various size is known prior to the detection of the position thereof, is detected by using the L-shaped first and second windows. In case where an object to be detected has another form, first and second windows each having another preferable form corresponding to the form of the object can be used to detect the position of the object. For instance, in case that the contour of an object is in a circular form, it is preferable that a first ring-shaped window having a diameter larger than the diameter of an object 8a and a second ring-shaped window having a smaller than the diameter of the object 8a as shown in FIG. 7 are used for the detection of the position of the object 8a indicated by hatching in this figure. As described above, the windows are comprised of pixels, of which the positions are discrete quantity, and thus it is not possible to precisely form the smoothly or evenly circular contour of the window. Therefore, in case of the conventional apparatus, it is very difficult to detect the outer periphery of a circular object due to the unevenness of the periphery of the object. In contrast, the apparatus of the present invention can surely detect the circular object when the periphery of the object is placed between the first and second ring-shaped windows formed as described above.

Figure 8:
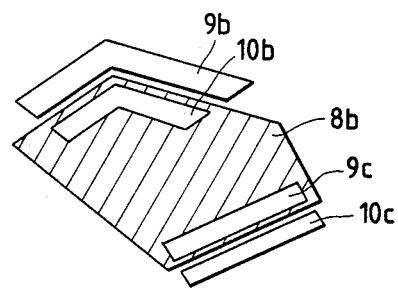
FIG. 8 is a diagram for showing other examples of first and second windows.

Further, in case that the contour of an object 8b is in a polygon form as shown in FIG. 8, the apparatus of the present invention can surely detect the periphery of the object by using a first pair of windows 9b and 10b and a second pair of windows 9c and 10c formed as shown in this figure. Similar to the process in FIG. 2, the first pair of windows 9b and 10b are moved horizontally and then it is determined whether $P_b$ is a maximum value. The second pair of windows 9c and 10c are also moved horizontally and then it is determined whether $P_c$ is a maximum value. As shown in FIG. 8, the simultaneous detection of more than one contour enables a substantial reduction in processing time.

While a preferred embodiment of the present invention has been described above, it is to be understood that the present invention is not limited thereto and that other modifications will be apparent to those skilled in the art without departing from the spirit of the invention. The scope of the present invention, therefore, is to be determined solely by the appended claims.

What is claimed is:

1. A contour detecting apparatus comprising:
a picture-data input device for the input of data on a picture including an object to be detected;
video-signal generating means for scanning the data on the picture and generating video signals each corresponding to luminance of each pixel of the picture;
picture-data memory means for sampling the video signals corresponding to each of two-dimensional coordinates of the pixels and storing as a picture the sampled video-signals; and
contour detecting means for moving relative to the picture stored in said picture data memory means a pair of a first picture section and a second picture section, said second picture section being arranged to be apart by a predetermined distance from and placed in parallel with the first picture section, said contour detecting means detecting the position of the first and second picture section in a case where an absolute value of a difference between a first sum of the video signals stored in said picture-data memory means corresponding to the pixels in the first picture section and a second sum of the video signals stored in said picture-data memory means corresponding to the pixels in the second picture section is a maximum value.

2. A contour detecting apparatus as set forth in claim 1 wherein said contour detecting means further includes means for moving relative to the picture stored in the picture-data memory means another pair of a third picture section and a fourth picture section, the fourth picture section being arranged to be apart by a predetermined distance from and placed in parallel with the third picture section, said contour detecting means detecting the position of the first and second picture section as an edge or part of the object in said case where the absolute value of the difference between the first sum of the video signals stored in said picture-data memory corresponding to the pixels in the first picture section and the second sum of the video signals stored in said picture-data memory means corresponding to the pixels in the second picture section is said maximum value, said contour detecting means further detecting at least the position of the third and fourth picture section as another edge or part of the object in a case where the absolute value of the difference between a third sum of the video signals stored in said picture-data memory means corresponding to the pixels in the third picture section and a fourth sum of the video signals stored in said picture-data memory means corresponding to the pixels in the fourth picture section is another maximum value.

3. A contour detecting apparatus comprising:
a picture-data input device for the input of data on a picture including an object to be detected;
video-signal generating means for scanning the data on the picture and generating video signals each corresponding to luminance of each pixel of the picture;
picture-data memory means for sampling the video signals corresponding to each of two-dimensional coordinates of the pixels and storing as a picture the sampled video-signals;
sum calculating means for moving relative to the picture stored in said picture-data memory means a pair of a first picture section and a second picture section, said second picture section being arranged to be apart by a predetermined distance from and placed in parallel with the first picture section, said sum calculating means calculating a first sum of the video signals stored in the picture-data memory means corresponding to the pixels in the first picture section and a second sum of the video signals stored in the picture-data memory means corresponding to the pixels in the second picture section; and
contour detecting means for detecting the position of the first and second picture section in a case where an absolute value of a difference between the first sum of the video signals stored in the picture-data memory means corresponding to the pixels in the first picture section and the second sum of the video signals stored in the picture-data memory means corresponding to the pixels in the second picture section is greater than a predetermined value.

4. A contour detecting apparatus as set forth in claim 3 wherein:

said sum calculating means comprises means for moving relative to the picture stored in the picture-data memory means at least another pair of a third picture section and a fourth picture section, which is arranged to be apart by a predetermined distance from and placed in parallel with the first picture section, said sum calculating means calculates a third sum of the video signals stored in the picture-data memory means corresponding to the pixels in the third picture section and a fourth sum of the video signals stored in the picture-data memory means corresponding to the pixels in the fourth picture section, and said contour detecting means detects the position of the first and second picture section as an edge or part of the object in said case where the absolute value of the difference between the first sum of the video signals stored in the picture-data memory means corresponding to the pixels in the first picture section and the second sum of the video signals stored in the picture-data memory means corresponding to the pixels in the second picture section is greater than the predetermined value, said contour detecting means further detecting at least the position of the third and fourth picture section as another edge or part of the object in the case where the absolute value of the difference between the third sum of the video signals stored in the picture-data memory means corresponding to the pixels in the third picture section and the fourth sum of the video signals stored in the picture-data memory means corresponding to the pixels in the fourth picture section is greater than another predetermined value.

5. A contour detecting apparatus comprising:

a picture-data input device for the input of data on a picture including an object to be detected;

video-signal generating means for scanning the data on the picture and generating video signals each corresponding to luminance of each pixel of the picture;

picture-data memory means for sampling the video signals corresponding to each of two-dimensional coordinates of the pixels and storing as a picture the sample video-signals;

moving means for moving relative to the picture stored in said picture-data memory means a pair of a first picture section and a second picture section, the first picture section having a form which is the same as the form of a part of the periphery of the object, the second picture section being arranged to be apart by a predetermined distance from and placed in parallel with the first picture section;

first sum calculating means for calculating a first sum of the video signals stored in said picture-data memory means corresponding to the pixels in the first picture section;

second calculating means for calculating a second sum of the video signals stored in the picture-data memory means corresponding to the pixels in the second picture section;

difference calculating means for calculating the difference between the first sum of the video signals stored in the picture-data memory means corresponding to the pixels in the first picture section and the second sum of the video signals stored in said picture-data memory means corresponding to the pixels in the second picture section; and contour detecting means for detecting the position of the first and second picture section as the contour of the object in a case where the absolute value of the difference between the first sum and the second sum is a maximum value.

6. A contour detecting apparatus as set forth in claim 5 wherein:

said moving means comprises means for moving relative to the picture stored in said picture-data memory means another pair of a third picture section and a fourth picture section, the third picture section having a form which is the same as the form of a part of the periphery of the object, the fourth picture section being arranged to be apart by a predetermined distance from and placed in parallel with the third picture section;

wherein said apparatus further comprises:

third sum calculating means for calculating a third sum of the video signals stored in said picture-data memory means corresponding to the pixels in the third picture section, fourth calculating means for calculating a fourth sum of the video signals stored in said picture-data memory means corresponding to the pixels in the fourth picture section;

wherein said difference calculating means calculates the difference between the third sum and the fourth sum; and wherein said contour detecting means detects the position of the first and second picture section as an edge or part of the object in said case where the absolute value of the difference between the first sum and the second sum is said maximum value and said contour detecting means detects the position of the third and fourth picture section as another edge or part of the object in the case where the absolute value of the difference between the third sum and the fourth sum is a maximum value.

* * * * *